(12) United States Patent
Ghahary et al.

(10) Patent No.: US 7,727,435 B2
(45) Date of Patent: Jun. 1, 2010

(54) ENGINEERED STONE

(75) Inventors: Akbar Ghahary, Fort Lee, NJ (US); Yifang Zhao, Randolph, NJ (US)

(73) Assignee: SAFAS Corporation, Clifton, NJ (US)

( * ) Notice: Subject to any disclaimer, the term of this patent is extended or adjusted under 35 U.S.C. 154(b) by 789 days.

(21) Appl. No.: 11/405,726

(22) Filed: Apr. 18, 2006

(65) Prior Publication Data

US 2007/0244222 A1  Oct. 18, 2007

(51) Int. Cl.
 *B27N 3/00* (2006.01)
(52) U.S. Cl. ............... 264/69; 264/71; 264/102; 264/109; 264/118; 264/119
(58) Field of Classification Search ......... 264/109, 264/72, 40.1, 40.5, 69, 71, 73, 115, 118, 264/DIG. 31, 102, 120, 236, 294, 101, 333, 264/140; 523/521; 425/169, 170, 432, 78, 425/135
See application file for complete search history.

(56) References Cited

U.S. PATENT DOCUMENTS

| | | | |
|---|---|---|---|
| 4,085,246 A * | 4/1978 | Buser et al. ............... 428/220 |
| 4,433,070 A | 2/1984 | Ross et al. |
| 4,664,954 A | 5/1987 | Hurd |
| 4,678,819 A | 7/1987 | Sasaki et al. |
| 4,698,010 A * | 10/1987 | Toncelli ............... 425/200 |
| 4,734,452 A | 3/1988 | Hashimoto et al. |
| 5,043,377 A | 8/1991 | Nogi et al. |
| 5,055,327 A | 10/1991 | Baskin |
| 5,079,279 A * | 1/1992 | Hayashi et al. ............... 523/171 |
| 5,244,941 A | 9/1993 | Bruckbauer et al. |
| 5,286,290 A | 2/1994 | Risley |
| 5,304,592 A * | 4/1994 | Ghahary ............... 524/437 |
| 5,314,729 A | 5/1994 | Ikezoe et al. |
| 5,476,895 A * | 12/1995 | Ghahary ............... 524/437 |
| 6,025,074 A * | 2/2000 | Matsuo ............... 428/402.2 |
| 6,548,157 B2 * | 4/2003 | Ghahary ............... 428/319.3 |
| 2006/0112646 A1 * | 6/2006 | Simmons ............... 51/295 |
| 2006/0293449 A1 * | 12/2006 | Weberg et al. ............... 525/107 |
| 2007/0003791 A1 * | 1/2007 | Rochette ............... 428/703 |
| 2007/0125990 A1 * | 6/2007 | Ghahary et al. ............... 252/601 |

* cited by examiner

*Primary Examiner*—Kat Wyrozebski
*Assistant Examiner*—Daniel Lee
(74) *Attorney, Agent, or Firm*—Bernd W Sandt

(57) ABSTRACT

The present invention relates to an engineered stone composite produced from a mineral aggregate, a synthetic resin and a binder using compression and vibration to obtain a high strength mineral composite with a high mineral content and a method for its preparation.

6 Claims, No Drawings

ENGINEERED STONE

BACKGROUND OF THE INVENTION

This invention relates to cast engineered stone and methods for making such engineered stone.

Synthetic stone products are well known and are in great demand due to their ability to be manufactured in a wide variety of patterns and colors that can not be consistently found in nature. Such compositions are for example described in U.S. Pat. Nos. 4,664,954, 4,085,246, 4,678,819, 4,734,452, 5,043,377 and 5,055,327. The disadvantage of the described stone compositions is that when molded they result in surfaces which reflect the properties of the resin more than the properties of the aggregates contained in the compositions. The engineered stone composites of the present invention resemble natural stone to a greater degree but have much better fabricability and are useful in slab or molded form in both interior and exterior walls of buildings, indoor and outdoor floors, fireplaces, tables and countertops, tiles and an assortment of other uses for natural stone. Typically synthetic stone surfaces or articles are created by spraying, casting or molding a curable synthetic resin containing inorganic and/or organic fillers, pigments and other additives to give a stone appearance.

This invention provides a stone composition that has improved properties over natural stone and is improved over simulated stones heretofore made in its abrasion resistance, hardness and chemical resistance and weatherability. These characteristics are particularly important for floor and outdoor applications. In general synthetic stone compositions based on high percentages of resins are not suitable for such purposes. Natural stone is difficult to cut into thin slices suitable for veneer uses and in addition are very brittle and breaks easily.

SUMMARY OF THE INVENTION

The present invention relates to engineered stone composites and particularly to thin stone slabs suitable as veneers. The composites of the present invention are obtained by a molding process wherein a siliceous or calcareous mineral particulate is combined with 3 to 10% of a crosslinkable resin and a binding agent and then is blended into a uniform mixture, vibrated to condense the volume and then subjected simultaneously to high external molding pressures and reduced pressures within the mold to form the engineered stone composite of the present invention. In the preferred embodiment of the present invention the mineral particulate is itself a composite of a crosslinked resin matrix and a siliceous or calcareous particulate mineral, preferably obtained by the same molding process and then comminuted.

In the preparation of the engineered stone of the present invention a siliceous or calcareous mineral is comminuted to a desirable size, mixed with a crosslinkable resin, which forms the matrix for the engineered stone. The matrix contains a binding agent and a polymerization catalyst for the resin and can contain small amounts of various other additives, such as a pigment or an antioxidant. The mixture is compacted by vibration and then molded into preferably a slab under high pressures while applying a vacuum to the mold to reduce the size of the aggregate in the mold by about half. The compacted composite is then heated to cause the polymerization and crosslinking of the resin to obtain the engineered stone. In the preferred embodiment of the invention the resulting initial composite is comminuted and used as the mineral particulate in a second molding process which repeats the conditions of the first molding step. Thus the molded product is broken up and then comminuted into a fine aggregate and recombined with an unsaturated matrix resin, binding agent, catalyst and additives. The mixture is then subjected to a second molding process again, employing the compaction and polymerization steps used in the initial molding process in a mold to form the mixture into the desired final structure such as a slab, veneer, sink or basin. When molded into a thin slab the resulting product can be readily laminated to rigid substrates such as metal surfaces and particularly metal honeycomb structures, wood or reinforced or rigid plastic.

It was discovered that unless the binding agent and the three-step mechanical molding process of the present invention is employed, the aggregate in the resulting composite is not adequately bonded and fails to give rise to composites having the necessary strength for the intended applications.

DETAILED DESCRIPTION OF THE INVENTION

The present invention is based on the use of a binding agent in combination with a three step molding process to accomplish the high stone content of the engineered stone. Thus the compaction reduces the volume of the stone aggregate by at least 40% from its original volume when added to a mold. Aggregate, resin and binder, after thorough blending, are placed in a mold capable of being subjected to vibration, a vacuum and compression. These three steps are preferably carried out simultaneously but can also be done sequentially with the vibration and vacuum steps preceding the compression step. As a result of this step the density of an aggregate in the mold is typically increased by about 100 percent although the actual density change will vary somewhat with the aggregate employed.

The compressed material is then adequately heated in the mold to cause the initiation of the polymerization of the crosslinkable resin by means of the catalyst included in the original blend. The actual temperature and heating time will vary with the resin and the catalyst employed but should be conducted such that the resin becomes fully crosslinked. It is believed that the binding agent added to the composite is physically attached to the aggregate but additionally participates in the crosslinking polymerization of the matrix resin. After cooling to room temperature the molded piece is removed from the mold and either used directly or comminuted to an aggregate having particle sizes in the range of 0.2 to 2 mm. The resulting chips, which are essentially a mineral aggregate, are then combined with resin, catalyst and other additives and blended until a uniform mixture is obtained which is then placed into a mold for the finished product form. The blended material is then subjected to a second compression step again using vibration, a vacuum and pressure on the mold. Once compressed the aggregate is heated to cause the polymerization of the resin in the mixture. After completion of the polymerization and cooling in the mold the molded article is removed from the mold and can be cut or polished to the desired form and surface.

The aggregates employed in the present invention are calcareous or siliceous minerals. Specific suitable calcareous minerals include marble and specific suitable siliceous minerals include quartz, quartzite, silica sand, granite, and porphyry. The preferred materials are however quartz or sand aggregates. The latter occur naturally in particulate form in particle sizes, which are suitable for use in forming the composites of the present invention. In order to achieve a desired pattern in the finished product it is possible to combine different aggregates and different sizes in the aggregate. In addition it is also possible to add a preferably inorganic pigment to the initial blend to achieve desired color variations. Although the sizes of the aggregate can vary, the aggregate should have a median size and distribution that will allow it to be compressed to the desired density. Generally the particles in initial mineral aggregate have a size ranging from 0.2 to 2 mm.

The preferred crosslinkable resins employed as the matrix for the composites of the present invention are unsaturated polyester resins known in the industry as gel coat resins. They comprise in general a low molecular weight linear resin obtained by the condensation of an aromatic acid such as phthalic acid or anhydride, with diols and also with an unsaturated component such as maleic anhydride to provide crosslinking properties. The polyester is dissolved normally in an aromatic monomer such as styrene, which acts as the crosslinking agent for the polyester resin when its polymerization is initiated. The polyester may be modified by adding other monomers or unsaturated polymers in addition to styrene, such as polyurethanes or acrylic acids or acrylate esters to achieve specific properties. Also linear dicarboxylic acids, such as adipic acid or other aliphatic acid, may be added to the phthalic acid component to increase flexibility. Preferred unsaturated polyester resins are condensation products of isophthalic anhydride and neopentyl glycol (NPG). These resins are commercially available from a number of sources such as Reichhold, Ashland, Lilly Industries, Valspar and Polydine as gel coat resins. Other matrix resin that can be employed are acrylic resins, based on such monomers as methyl methacrylate, ethyl acrylate or butyl acrylate, suspended in the acrylate monomer known in the art as sirups. In order to crosslink the acrylic resin diunsaturated acrylate monomers are added to the sirup. Such diunsaturated monomers include glycidyl methacrylate and ethylene dimethacrylate, ethylene glycol diacrylate, divinyl benzene, diallyl phthalate and allyl acrylate or methacrylate. The acrylate resins may further be modified to contain polyurethane resins in addition to or in place of the low molecular weight acrylic resin.

The polymerization of the matrix resin is usually initiated by the addition of a free radical initiator and preferably a peroxy or azo compound such as methyl ethyl ketone peroxide, t-butyl perbenzoate, and lauroyl peroxide, or 2,2'-azobisisobutyronitrile. The initiator also referred to herein as catalyst is generally employed in the range of 1 to 3% by weight of the resin depending on the type employed and should be adequate to totally crosslink the resin.

The binding compositions employed in the present invention, which allow for the inclusion of higher amounts of mineral aggregate, are acrylate phosphates which are obtained by the reaction of phosphorus pentoxide and hydroxy acrylates to give acrylate phosphates wherein the ester of the acrylate has from 1 to 8 carbons. Suitable phosphates include those of methyl methacrylate, ethyl acrylate, ethyl methacrylate, propyl acrylate, propyl methacrylate and butyl acrylate. These compositions are employed in a concentration of 0.05 to 5% by weight of the resin/mineral aggregate mixture. The binders can be employed in either or both the initial and final molding steps.

Other additives include pigments to provide desired color variations such as titanium dioxide, carbon black, iron oxides and copper oxides. It is generally also desirable to add an antioxidant or UV stabilizer if the final product is exposed to strong sunlight.

Well known commercial equipment can be employed in producing the composites of the present invention. Preferably the vibration and compaction of the aggregate mixture under a vacuum, which removes the air from the aggregate in the mixture, is conducted in machines such as vacuumvibropresses which are commercially available. In the alternative the vibration treatment of the aggregate mixture can be a separate initial step. The compression presses employed generally are capable of exerting pressures of up to 10,000 psig. Optimum pressures will vary with the size and type of the mineral particles in the aggregate and are best experimentally determined on the basis of the desired end product properties. Vacuum pumps useful in the present invention are generally classified as medium vacuum pumps and should be able to achieve vacuums in the range of 0.1 to 1 pascal.

The invention is further illustrated by the following examples.

EXAMPLE 1

93 parts of a commercially available natural quartz sand, having an average particle size of 0.6 mm in diameter was blended with 7 parts of an unsaturated neopentyl glycol-isophthalic acid resin containing styrene as the crosslinking agent commercially available from Reichhold Chemicals Inc. as "PolyLite" 31212-15, 2 parts of titanium dioxide as a white pigment and 0.25 parts of methyl methacrylate phosphate are combined in a drum blender until a uniform mixture was obtained. After the initial blending, 0.05 parts by weight of a dicarboxylate peroxide, commercially available as "Perkadox" 16 and 0.1 parts of a peroxide ester, were added to the blend as the polymerization initiator. The resulting blended material was poured into a rectangular silicone rubber open mold and placed on a vibrator table and vibrated until no further reduction of the thickness of the mixture occurred. The resulting aggregate was placed into a vacuum chamber surrounding the mold, covered and compressed by a press exerting a pressure of 2000 to 3000 psig while the vacuum was applied. The compressed material while still in the mold was then placed in an oven maintained at 100° C. for 30 minutes to cause the crosslinking and hence curing of the compressed composite.

The resulting composite after gradual cooling to room temperature can be used as such but is preferably broken up to be used as the mineral particulate in a second molding. In this example the molding was broken up and comminuted in a hammer mill to an average particle size of 0.25 mm in diameter. The foregoing molding procedure was then essentially repeated but using the comminuted resin containing aggregate in place of the initial sand aggregate. The mold used in this second step was in the form of the final desired product such as to result in a rectangular slab which could be varied to having a thickness of 10 to 30 mm. The resulting composite had a density of 2.5 g/cc and could be polished to provide a surface undistinguishable from a polished natural stone surface and was readily bonded with a polyurethane adhesive to an aluminum honeycomb sheet.

EXAMPLE 2

93 parts of a commercially available natural quartz sand, having an average particle size of 0.6 mm was blended in a standard drum blender with 7 parts of a crosslinkable polymethyl methacrylate resin sirup commercially available as "Dagment 1004" from Degussa, 2 parts of titanium dioxide as a white pigment and 0.25 parts of methyl methacrylate phosphate as the binder until a uniform mixture was obtained. After the initial blending, 0.1 parts by weight of commercially available dibenzyl peroxide is added to the blend as the polymerization initiator. The resulting blended material is poured into a rectangular rubber mold and then placed onto a vibrating table and agitated until no further reduction in the thickness of the material in the mold occurred. The initially compacted material in the mold was covered with a rubber sheet placed in a vacuum chamber in a compression molding press where the mixture was compressed to a pressure of 2000 to 3000 psig while being subjected to a vacuum. The compressed material while still in the mold was then placed in an oven maintained at 100° C. for 30 minutes to cause the crosslinking and hence curing of the compressed composite.

The resulting composite after gradual cooling to room temperature to was broken up and comminuted in a hammer mill to an average particle size of 0.25 mm in diameter and combined with resin and binding agent as in the initial molding step.

The molding procedure for the resulting blend was essentially repeated but using the comminuted acrylic resin containing aggregate in place of the initial sand aggregate. The mold used in this second step was in the form of the final desired product such as to result in a rectangular slab having a thickness which could be varied to having a thickness of 10 to 30 mm. The resulting composite had a density of 2.5 g/cc and could be polished to provide a surface undistinguishable from a polished natural stone surface and was readily bonded with a polyurethane adhesive to an aluminum honeycomb sheet.

The invention claimed is:

1. The process of making an engineered stone composition, which comprises (1) blending from 3 to 10% of a crosslinkable matrix resin with at least 80% by weight of the total composition of a siliceous or calcareous mineral particulate and from 0.05 to 5% of an acrylic phosphate until a uniform mixture is obtained, (2) placing the resulting mixture in a mold and subjecting such to vibration to condense the mixture, compression molding the resulting mixture under vacuum conditions until volume of the original mixture is reduced by at least 40% and thereafter crosslinking the matrix resin, (3) comminuting the product of step 2 into a particulate aggregate, (4) blending from 3 to 10% of a crosslinkable unsaturated polyester or acrylic resin with at least 80% by weight of the total composition with the particulate aggregate of step 3 until a uniform mixture of the aggregate in the matrix resin is obtained, and (5) placing the mixture of step 4 in a mold and subjecting such to vibration to condense the mixture, compression molding the resulting mixture under vacuum until the volume of the initial mixture is reduced by at least 40% and thereafter crosslinking the matrix resin.

2. The process of claim 1 wherein from 90 to 93% by weight of siliceous particulate is blended with the matrix resin.

3. The process of claim 2 wherein the mineral particulate is quartz sand.

4. The process of claim 1 wherein the matrix resin of step 1 is an unsaturated polyester resin or acrylic resin.

5. The process of claim 1 wherein the matrix resin of step 3 is an acrylic resin.

6. The process of claim 1 wherein the matrix resin of step 1 is a neopentyl glycol/isophthalic acid resin.

* * * * *